(12) United States Patent
Splett

(10) Patent No.: US 7,016,443 B1
(45) Date of Patent: Mar. 21, 2006

(54) SYNCHRONIZATION METHOD AND SYSTEM FOR CLOCK SIGNAL SOURCES, IN PARTICULAR IN PACKET TRANSMISSION COMMUNICATION SYSTEMS

(75) Inventor: Armin Splett, Ulm (DE)

(73) Assignee: Siemens Aktiengesellschaft, Munich (DE)

( * ) Notice: Subject to any disclaimer, the term of this patent is extended or adjusted under 35 U.S.C. 154(b) by 775 days.

(21) Appl. No.: 10/048,954

(22) PCT Filed: Aug. 3, 2000

(86) PCT No.: PCT/DE00/02605

§ 371 (c)(1),
(2), (4) Date: Feb. 5, 2002

(87) PCT Pub. No.: WO01/11811

PCT Pub. Date: Feb. 15, 2001

(30) Foreign Application Priority Data

Aug. 6, 1999 (DE) .............................. 199 37 245

(51) Int. Cl.
*H04L 7/00* (2006.01)
(52) U.S. Cl. .................. 375/354; 375/293; 375/355; 375/371; 375/373; 370/324; 370/350; 370/395.62; 370/507
(58) Field of Classification Search ............ 375/354, 375/371, 373, 355, 293; 370/229, 398, 392, 370/324, 350, 395.62, 507; 714/815
See application file for complete search history.

(56) References Cited

U.S. PATENT DOCUMENTS

| 4,881,223 | A | * | 11/1989 | Debuysscher | ............... | 370/398 |
| 5,027,351 | A | * | 6/1991 | De Prycker et al. | ......... | 370/229 |
| 5,802,082 | A | * | 9/1998 | Roppel | ....................... | 714/815 |
| 6,351,474 | B1 | * | 2/2002 | Robinett et al. | ............. | 370/486 |

FOREIGN PATENT DOCUMENTS

| DE | 197 31 205 A1 | 1/1999 |
| EP | 0 283 079 A2 | 9/1988 |
| EP | 0 796 022 A2 | 9/1997 |
| EP | 0 878 929 A2 | 11/1998 |
| EP | 0 924 878 A2 | 6/1999 |
| WO | WO 96/27822 | 9/1996 |
| WO | WO 99/33207 | 7/1999 |
| WO | WO 99/59052 | 11/1999 |
| WO | WO 00/42728 | 7/2000 |
| WO | WO 00/48422 | 8/2000 |

* cited by examiner

*Primary Examiner*—Stephen Chin
*Assistant Examiner*—Ted M. Wang
(74) *Attorney, Agent, or Firm*—Morrison & Foerster LLP

(57) ABSTRACT

The invention relates to a method for synchronization of clock sources in a communications system, in particular a radio communications system, having a large number of devices (PSTN, MSC, RNM, BSi, MSi, OMC) which communicate directly or indirectly with one another and have reference clock sources (Cs) for their operation.

In order to overcome aging effects or timing errors in the clock sources (C), the invention proposes the clock sources (C) of one or more communicating devices (MS, BS, RNM) be synchronized by means of asynchronous signaling from at least one reference clock source (Cs). This even allows devices with clock sources that are becoming old to be operated reliably. Furthermore, in particular, there is no need for every device to have its own high-precision clock source (CS). Use is particularly advantageous in communications systems in which no reference clock is transmitted via a landline network.

15 Claims, 2 Drawing Sheets

SYNCHRONIZATION METHOD AND SYSTEM FOR CLOCK SIGNAL SOURCES, IN PARTICULAR IN PACKET TRANSMISSION COMMUNICATION SYSTEMS

CLAIM FOR PRIORITY

This application claims priority to International Application No. PCT/DE00/02605 which was published in the German language on Aug. 3, 2000.

TECHNICAL FIELD OF THE INVENTION

The invention relates to a method for synchronization of clock sources and to a communications system which uses this method.

BACKGROUND OF THE INVENTION

In communications systems, in particular, for example, radio communications systems, information (for example voice, picture information or other data) is transmitted by means of electromagnetic waves via a radio interface between a transmitting and a receiving station (base station and subscriber station). The electromagnetic waves are in this case transmitted at carrier frequencies which are in the frequency band provided for the respective system. By way of example, frequencies in the frequency band around 2000 MHz have been provided for the UMTS (Universal Mobile Telecommunications System) or other 3rd generation systems, for future mobile radio systems using, for example CDMA or TD/CMDA transmission methods (TD/CDMA: Time/Code Division Multiple Access) via the radio interface.

Individual system devices for mobile radio systems which are considered by way of example, such as base stations, require a high-precision clock source, particularly for radio operation. Oven-stabilized crystal oscillators are currently used as clock sources for this purpose, and are synchronized via a landline to a high-precision reference clock source (which is preferably defined with atomic accuracy) in a synchronous switching system, for example a PCM switching system (PCM: Pulse Code Modulation). Owing to the complexity of their production, these clock sources are expensive.

However, in the future, base stations will no longer be connected just to PCM networks but also to packet-switching networks (IP, ATM/asynchronous transfer mode). Such synchronization of clock sources via landlines will no longer be feasible, without problems. Other synchronization methods via satellite links (GPS: Global Positioning System) or via an atomic standard that is installed are feasible, but are generally very complex and expensive.

Another example is digital electronic selection systems, in which individual stations and devices likewise require complete synchronization. However, these are also subject to the problem that it is complex and expensive to supply a basic clock for tuning purposes, for the reasons mentioned above.

A cellular telecommunications network is known from WO 99 33207, which comprises a higher-level timing unit in a monitoring node in a network, and a lower-level timing unit in a monitoring node or a monitored node, with the timing unit which initiates the synchronization using the response of the synchronization analysis to determine the synchronization matching for the lower-level timing unit.

EP-A-0 283 079 describes an asynchronous time domain system, which contains at least one node with a switching unit to which a large number of user stations are connected via transmission connections, and which is suitable for connecting the user stations to one another, with at least one of the user stations being a timing station, whose time information is made available to the other user stations once the connections have been set up.

SUMMARY OF THE INVENTION

In one embodiment of the invention, there is a method for synchronization of clock sources in a communication system. The method includes, for example, providing a plurality of devices to communicate with one another, each device having a reference clock source for operation, and the clock sources of one or more of the plurality of devices are synchronized using asynchronous signaling from at least one of the reference clock sources, comparing a received time and/or reference time of one of the devices having a clock, which is based on the clock source, forms a time difference, and determining a number of time differences successively and arranging the time difference with linear regression and/or a weighting factor.

In another aspect of the invention, the signaling occurs in response to a request, which is sent by one of the devices with a clock source to another of the devices with a reference clock source, and/or allows a delay time to be determined.

In another aspect of the invention, time information is interchanged between the plurality of devices in the communications systems, which time information is provided centrally and is transmitted within a transmission frame.

In yet another aspect of the invention, the method includes a specific signaling bit or a complex timer packet with a time and date transmitted as time information.

In another aspect of the invention, aging and/or other timing inaccuracy in a clock source can be synchronized and/or tuned and is compensated for and/or is readjusted.

In another aspect of the invention, more than 90,000 time differences are determined successively and are averaged.

In still another aspect of the invention, a weighting factor is inversely proportional to the response time.

In another aspect of the invention, the plurality of devices with autonomous stable clock sources but without a correspondingly suitable synchronization control device transmit synchronization information between the plurality of devices with a reference clock source and with a synchronization control device and devices with a clock source which can be synchronized.

In another aspect of the invention, a mobile device with a clock source configured for synchronization moves from a first area into a second area, synchronization is performed by the device with a reference clock source.

In yet another aspect of the invention, the communications system is a packet-switching system.

In another embodiment of the invention, there is a communications system. The system includes, for example, a plurality of devices to communicate with one another and having reference clock sources for operation, the clock sources of one or more of the plurality of devices is synchronized using asynchronous signaling from at least one of the reference clock sources, and one of the plurality of devices having a clock source is provided for synchronization and compares the received time and/or a reference time which is estimated or determined by the device using an instantaneous time, which is based on the device's clock source, and forms a time difference, wherein the communications system is configured for a number of time differences which are determined successively and are averaged using linear regression and/or a weighting factor in the averaging process.

In another aspect of the invention, mobile stations and base stations have a clock source configured for synchronization via external asynchronous information signals, and have a synchronization control device.

BRIEF DESCRIPTION OF THE DRAWINGS

An exemplary embodiment will be explained in more detail in the following text with reference to the drawing, in which.

DETAILED DESCRIPTION OF THE PREFERRED EMBODIMENT

The invention provides a synchronization method and system for clock sources in communications systems.

Devices with such clock sources can be synchronized and the method for synchronizing them allows devices with clock sources to be operated reliably, without needing to be continually connected to a high-precision reference clock source. Furthermore, there is no need for every device to have its own precision clock source, with a high timing accuracy.

In addition, the capability to allow simple synchronization in Internet protocol (IP) lines or ATM lines without using very high precision clock sources in all the devices in the communications network is particularly advantageous.

Figure 1:
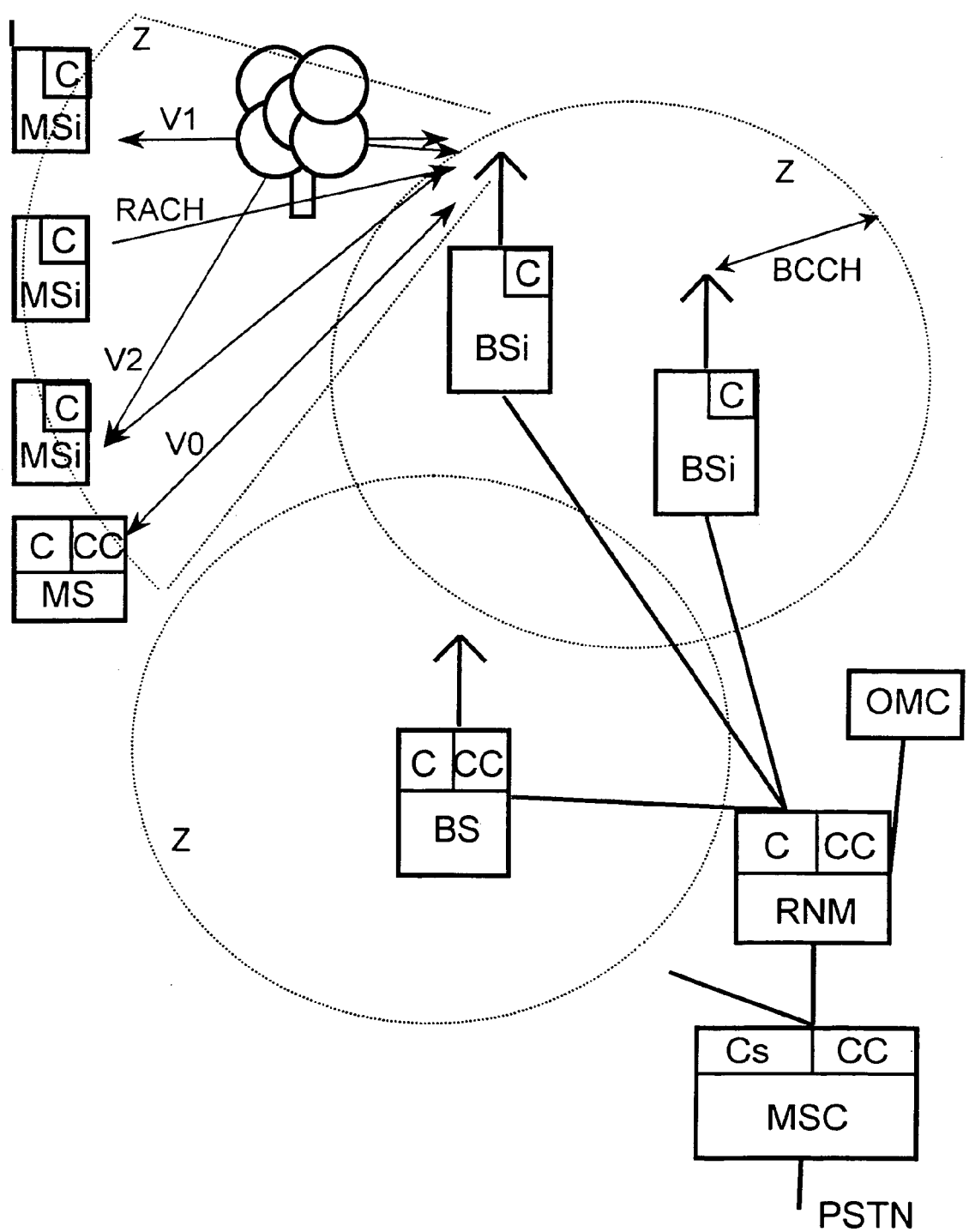
FIG. 1 shows a block diagram of a mobile radio system with time synchronization.

The mobile radio system illustrated in FIG. 1, as an example of a known radio communications system, comprises a large number of base station control devices or mobile switching centers MSC, which are networked with one another and provide access to a landline network PSTN. Furthermore, these mobile switching centers MSC are each connected to at least one device RNM for allocating radio resources. Each of these devices RNM itself allows a connection to be set up to at least one base station BS, BSi. One such base station BS can set up a connection via a radio interface to subscriber stations, for example mobile stations MS, MSi, or other mobile and stationary terminals. At least one radio cell Z is formed by each base station BS. In the case of sectorization or in hierarchical cell structures, a number of radio cells Z are also supplied by each base station BS.

By way of example, FIG. 1 shows existing connections V0, V1, V2 for transmitting user information and signaling information between mobile stations MSi and MS, and a base station BS. Furthermore, a request for resource allocation or a short acknowledgement message in an access channel RACH by a further mobile station MSi is shown. In addition, the illustration shows an organization channel (BCCH: Broadcast Control CHannel), which is intended for transmitting user and signaling information at a defined transmission power level from each of the base stations BSi for the mobile stations MS, MSi.

An operation and maintenance center OMC provides monitoring and maintenance functions for the mobile radio system, or for parts of it. The functionality of this structure can be transferred to other radio communications systems, in particular for subscriber access networks with wire-free subscriber access.

According to the present exemplary embodiment, time information, which is produced centrally in the network, is interchanged between the various devices in the communications system.

To this end, there is or are one or more central synchronized "clock servers" or reference clock sources Cs somewhere in the network, in this case, by way of example, in the mobile switching center MSC. In this case, these reference clock sources Cs transmit their "clock time", controlled by a synchronization and clock control device CC, for example in a specific "time" packet to a device MS, BS to be synchronized. The time packets are in this case preferably transmitted in response to a corresponding request BQ from a device BS, MS to be synchronized, but can also be initiated by the device MSC with the reference clock source Cs, or by any other device.

A base station BS, a mobile station MS and the device RNM for allocating radio resources are illustrated here as examples of devices which need to be synchronized. These each have an adjustable clock source C, and/or a clock source C which can be synchronized, and likewise each have a synchronization control device CC.

Depending on the configuration of the system, the time packets may, for example, comprise a specific signaling bit in an otherwise known transmission frame. However, time packets comprising a complex, autonomous information frame are also possible, which transmit not only a start signal for synchronization but, furthermore, also the clock time and the date.

In one preferred embodiment, the aging or any other timing inaccuracy is determined in a clock source C which is to be synchronized or can be trimmed. To do this, a base station BS (which is considered by way of example) compares the received time with its own instantaneous time, which is based on its internal clock source C. After suitable processing of the time differences, the aging of the clock source C in the base station BS, in particular a crystal oscillator contained in it, is determined, and can then be compensated in an appropriate manner electronically, by readjusting the clock source C or the crystal oscillator.

Figure 2:
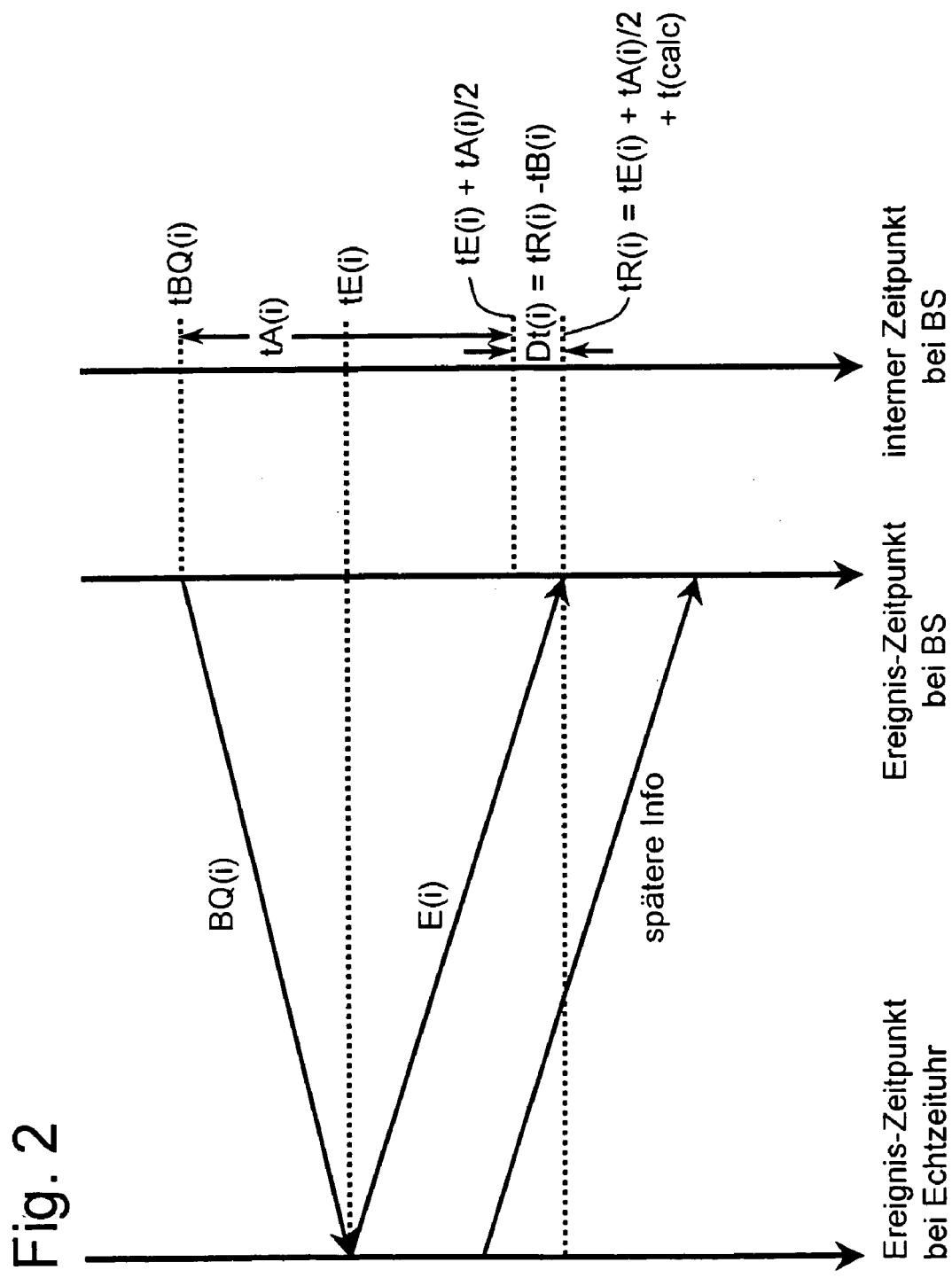
FIG. 2 shows a timing diagram to illustrate the relationship between the times.

FIG. 2 shows the sequence of the subsequent method with a first timeline for a reference clock source Cs with the real, exact time in the mobile switching center MSC, a second timeline which shows the time value of signals arriving at a base station BS, and a third timeline, which shows the timing of the internal clock C in the base station BS in comparison thereto.

Since the time or a synchronization signals is in each case sent in response to a previous request BQ(i) to the base station BS, the base station BS can measure the response arriving at it with the response time or duration tA(i), using a time or a time value E(i). In the simplest case, the received time E(i) corresponds to the clock time for transmission of the response from the reference clock source Cs.

The single delay time of the time packet from the clock source to the base station BS is then estimated as half the response time tA(i)/2. The difference times, which are determined via the estimate, and their reliability are weighted, for example using a weighting factor g(i) in inverse proportion to the response time A(i).

Every ten seconds, for example, the base station BS turns a time request BQ(i), which is numbered with i+n (where n is a sequential natural number) to the synchronized or synchronous clock source Cs. With the conventional system design at the moment, the base station BS receives a time value tE(i) as a response, on average after a response time tA(i) of two seconds. Half the response time tA(i)/2 (on average one second) is added to the received time tE(i), and this gives a reference time tR(i):

$$tR(i)=tE(i)+tA(i)/2.$$

The difference between the internal time tB(i) of the base station BS and the time of reception of tE(i) is given by $$Dt(i)=tR(i)-tB(i)$$

This difference Dt(i) indicates the error in the timing of the internal clock source C in the base station BS. However, the difference Dt(i) is not a reliable value, since the delay times from the base station BS to the reference clock sources Cs and back, and the processing times in the reference clock source Cs may vary. The specific values tA(i) and Dt(i) thus originate from estimates.

A weighting factor g(i) is advantageously introduced for these difference times Dt(i), for example the inversely proportional response time, that is to say $$g(i)=1/tA(i).$$

A mean relative frequency error Df of the clock source C in the base station BS can be determined using the following equation (linear regression with sums over i from 1 to n) from i difference times:

$$Df/f0=\{n\Sigma[g(i)^2Dt(i)tB(i)]-$$

$$\Sigma[g(i)Dt(i)]\Sigma[g(i)tB(i)]\}$$

$$/\{n\Sigma[g(i)^2tB(i)^2]-(\Sigma[g(i)tB(i)])^2\}$$

Depending on the embodiment of, for example, the crystal oscillator in the clock source C in the base station BS, the frequency of the crystal oscillator can be readjusted, and hence synchronized, in its circuit with the determined relative frequency error Df/f0 where f0 is the nominal frequency of the clock source or of the crystal oscillator, using, for example, a proportional/integral regulator.

The achievable accuracy in this example is calculated as follows. The standard deviation of the error Df/f0 in the delay time estimate, and hence the difference accuracy sDt of the difference Dt, is assumed to be sDt=0.1 seconds on the basis of statistical independence between the individual responses. The averaging time can be assumed to be, or regarded as, T=1 million seconds (12 days), since crystal oscillators are already available at low cost which age very slowly, and which need to be readjusted at periods of a few days.

Based on n=100 000 responses in 12 days, the standard deviation sDf/f0 of the estimated relative frequency error can then be estimated on the basis of fluctuations in the package-switching network to be $$SDf/f0=sDt/(T\sqrt{n})\approx 0.3 ppb$$

which, with a requirement for a frequency stability of 10 ppb, provides sufficient safety margins for the assumptions made above.

In preferred embodiment, the transmitted response E(i) is a time value which takes account of the computation, processing and/or waiting time. It is thus possible to take account of waiting times prior to the start of processing of the request BQ(i). However, requests such as these are preferably processed with priority, in order to produce as little time variance as possible.

A sequential number or a text, for example, can be transmitted as the time value in the response E(i). By way of example, a frame number of the successively numbered data transmission blocks in a mobile radio network or an IP network can also be used as the sequential number.

Alternatively, and in order to allow the delay time to be determined as exactly as possible, separate response signals can also be transmitted in response to a request BQ(i). For example, a first response signal could form only an unspecified response, while actual time information is transmitted in a second response.

It is, of course, also possible to use conventional devices with autonomous clock sources in the communication system, whose clock sources are so accurate that there is no need to synchronize them continually and no synchronization device CC is provided. In the case of devices such as these, for example the base stations BSi in FIG. 1, these devices then transmit requests BQ(i) and response signals E(i) between, for example, a mobile station MS and the mobile switching center RNM.

Applications are also possible between the CORE within the base station, in which the synchronization with the external stations takes place, and remote units in a base station, for example carrier units which process one or more carriers and/or carrier frequencies, if the communications system has, for example, base stations with remote units (distributed base stations), or between a base station and base and mobile switching centers.

In the method according to the invention, when a mobile device with a clock source which can be synchronized moves from the area of one device with a reference clock source to the area of another device with a reference clock source, the synchronization is carried out, in particular is continued, by means of the other device with a reference clock source.

What is claimed is:

1. A method for synchronization of clock sources in a communications system, comprising:
   providing a plurality of devices to communicate with one another, each device having a reference clock source for operation, and the clock sources of one or more of the plurality of devices are synchronized using asynchronous signaling from at least one of the reference clock sources;
   comparing a received time and/or reference time of one of the devices having a clock source, when the time, which is based on the clock source, forms a time difference; and
   determining a number of time differences successively and arranging the time differences with a weighting factor, wherein
   the weighting factor is inversely proportional to a response time.

2. The method as claimed in claim 1, in which the signaling occurs in response to a request, which is sent by one of the devices with a clock source to another of the devices with a reference clock source, and/or allows a delay time to be determined.

3. The method as claimed in claim 1, in which time information is interchanged between the plurality of devices in the communications systems, which time information is provided centrally and is transmitted within a transmission frame.

4. The method as claimed in claim 3, in which a specific signaling bit or a complex timer packet with a time and date transmitted as time information.

5. The method as claimed in claim 1, in which aging and/or other timing inaccuracy in a clock source can be synchronized and/or tuned and is compensated for and/or is readjusted.

6. The method as claimed in claim 1, in which more than 90,000 time differences are determined successively and are averaged.

7. The method as claimed in claim 1, in which the plurality of devices with autonomous stable clock sources but without a correspondingly suitable synchronization control device transmit synchronization information between the plurality of devices with a reference clock source and with a synchronization control device and devices with a clock source which can be synchronized.

8. The method as claimed in claim 1, wherein when a mobile device with a clock source configured for synchronization moves from a first area into a second area, synchronization is performed by the device with a reference clock source.

9. The method as claimed in claim 1, in which the communication system is a packet-switching system.

10. The method of claim 1, wherein the determining step further including linear regression.

11. A communications system, comprising:
a plurality of devices to communicate with one another and having reference clock sources for operation, the clock sources of one or more of the plurality of devices is synchronized using asynchronous signaling from at least one of the reference clock sources, and
one of the plurality of devices having a clock source is provided for synchronization and compares the received time and/or a reference time which is estimated or determined by the device using an instantaneous time, which is based on the device's clock source, and forms a time difference, wherein
the communications system is configured for a number of time differences which are determined successively and are averaged using a weighting factor in the averaging process, and
the weighting factor is inversely proportional to a response time.

12. The communications system of claim 11, wherein mobile stations and base stations have a clock source configured for synchronization via external asynchronous information signals, and have a synchronization control device.

13. The communication system of claim 11, wherein the number of time difference are averaged further including using linear regression.

14. A communication device for a communication system, comprising:
a clock source configured to be synchronized by an asynchronous signaling from at least one reference clock source of one or more communicating devices;
a synchronization control device which compares a received time and/or a reference time, which is determined or estimated therefrom, having an instantaneous time, which is based on its own clock source which can be synchronized, and forms a time difference, wherein
the synchronization control device is configured such that a number of time differences are determined successively and are averaged, with a weighting factor being used in the averaging process, and
the weighting factor is inversely proportional to a response time.

15. The communication device of claim 14, wherein the number of time difference are averaged further including using linear regression.

* * * * *